US 8,635,686 B2

(12) United States Patent
Sriram

(10) Patent No.: US 8,635,686 B2
(45) Date of Patent: Jan. 21, 2014

(54) INTEGRATED PRIVILEGE SEPARATION AND NETWORK INTERCEPTION

(75) Inventor: T V Sriram, Bangalore (IN)

(73) Assignee: Apple Inc., Cupertino, CA (US)

( * ) Notice: Subject to any disclaimer, the term of this patent is extended or adjusted under 35 U.S.C. 154(b) by 919 days.

(21) Appl. No.: 11/975,517

(22) Filed: Oct. 19, 2007

(65) Prior Publication Data
US 2008/0295146 A1    Nov. 27, 2008

(30) Foreign Application Priority Data

May 25, 2007    (IN) .......................... 1122/DEL/2007

(51) Int. Cl.
*G06F 9/00*    (2006.01)
(52) U.S. Cl.
USPC .......................................................... 726/12
(58) Field of Classification Search
USPC .......................................................... 726/12
See application file for complete search history.

(56) References Cited

U.S. PATENT DOCUMENTS

| | | | |
|---|---|---|---|
| 6,711,689 B2 | 3/2004 | Lumme et al. | |
| 6,907,533 B2 * | 6/2005 | Sorkin et al. | 726/22 |
| 7,185,192 B1 * | 2/2007 | Kahn | 713/155 |
| 2003/0037252 A1 * | 2/2003 | Abrams | 713/200 |
| 2006/0053491 A1 * | 3/2006 | Khuti et al. | 726/23 |
| 2006/0143699 A1 * | 6/2006 | Nagata et al. | 726/11 |

* cited by examiner

*Primary Examiner* — Cordelia Zecher
(74) *Attorney, Agent, or Firm* — Blakely, Sokoloff, Taylor & Zafman LLP

(57) ABSTRACT

Apparatus, systems, and methods may operate to receive an attack request comprising operating system privilege use instructions associated with a gateway and slave process exploit code instructions. The attack request may be contained by processing the request as a user associated with an assigned slave module processing on the gateway. The slave module is prevented from connecting to or scanning any internet protocol address and port that is not specified in a policy database having network interception policy rules and file system privilege rules associated by a key comprising a slave module operating system identifier associated with the slave module. Additional apparatus, systems, and methods are disclosed.

30 Claims, 4 Drawing Sheets

INTEGRATED PRIVILEGE SEPARATION AND NETWORK INTERCEPTION

RELATED APPLICATIONS

The present application claims priority to India Patent Application No. 1122/DEL/2007 filed in the India Patent Office on May 25, 2007 and entitled "INTEGRATED PRIVILEGE SEPARATION AND NETWORK INTERCEPTION;" the disclosure of which is incorporated by reference herein.

FIELD

The embodiments disclosed herein relate generally to data processing, including maintaining network security against unauthorized access.

BACKGROUND

Data is collected, organized, and processed for virtually every transaction and communication that occurs in today's global economy. The integrity of this information (e.g., its authenticity and/or security) has become important to enterprises and individuals. Consequently, a variety of techniques to secure information and the components that process it have been developed.

Application gateways (AGs) are usually built as applications on operating systems (e.g., Windows® and Linux® operating systems), and often act as a portal between one network and another (e.g., a public network and a private network). AGs exposed to public networks are often subject to attack, and therefore vulnerable. If an attack succeeds in compromising AG security measures, unauthorized entities may be permitted to access AG operating system (OS) privileges to make use of AG facilities.

One approach to exploiting the vulnerability of an AG includes the use of codes that take over the AG OS with privileges that the AG has on the OS, so that OS facilities can be used by unauthorized entities (e.g., a hacker accessing the Bourne Again Shell (bash) shell). This type of attack is commonly made against web servers, for example. Another approach involves accessing AG privileges on the OS to use OS facilities in a seemingly normal manner (e.g., sending a command with a payload that executes to run as an AG process, scanning the network coupled to an internal, private network server). This type of attack is often used against routers and other intermediary devices. Since AGs may be involved in both scenarios, they may be vulnerable to both approaches.

SUMMARY

In various embodiments, apparatus, systems, and methods that operate to integrate privilege separation and network interception are provided. For example, in some embodiments, privilege separation and network interception may be integrated to receive and contain attack requests. Such requests may comprise operating system privilege use instructions associated with a gateway and slave process exploit code instructions, for example.

The attack request may be contained by processing the request as a user associated with an assigned slave module executing on the gateway. The slave module is prevented from connecting to or scanning any internet protocol address and port that is not specified in a policy database having both network interception policy rules and file system privilege rules. The interception and file system rule sets are associated by a key comprising a slave module OS identifier associated with the slave module. Other embodiments are also described, and along with the foregoing example, will be set forth in detail below.

DETAILED DESCRIPTION

Figure 1:
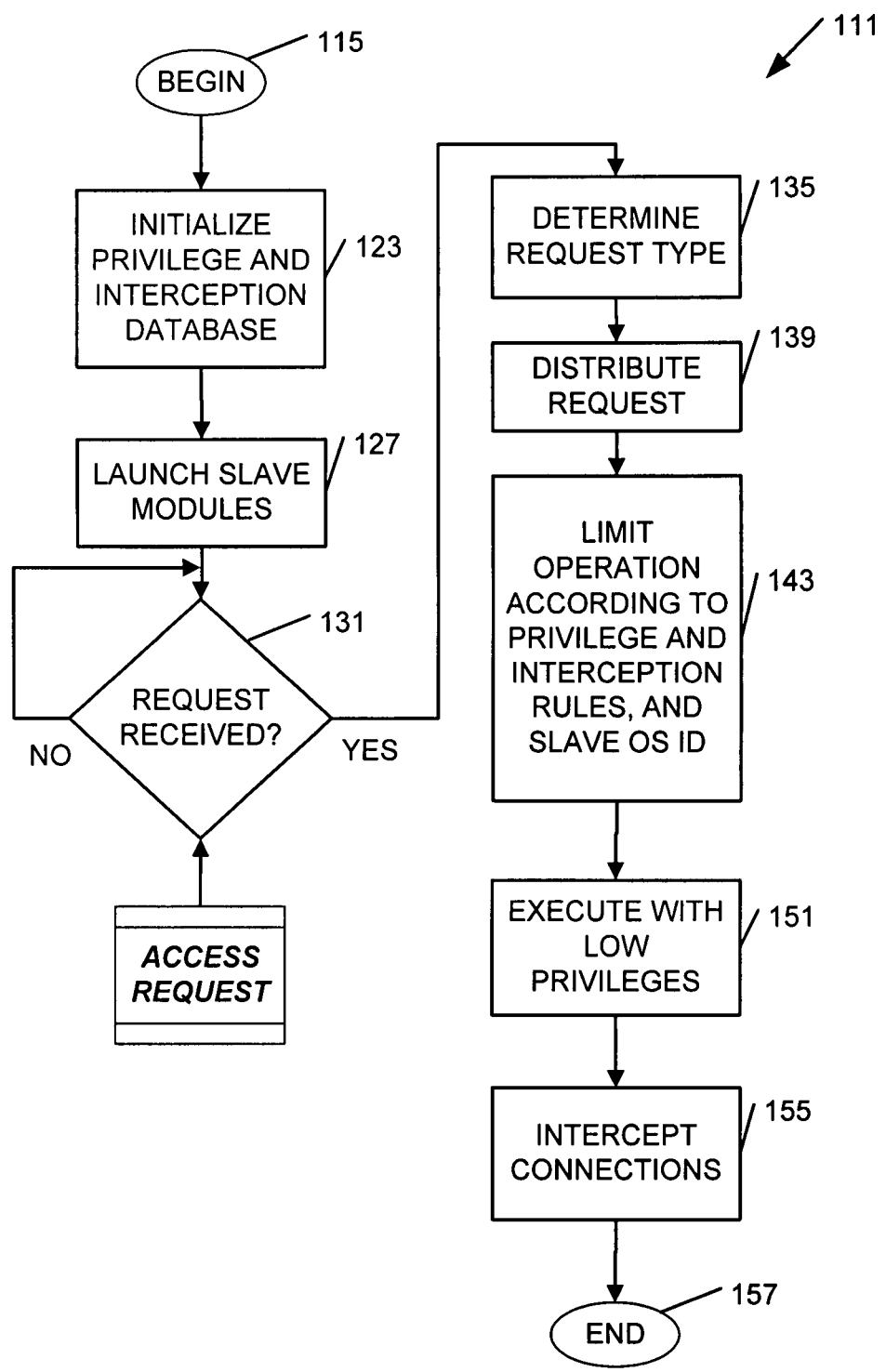
FIG. 1 is a flow diagram illustrating integrated privilege separation and network interception methods according various embodiments of the invention.

Some of the challenges described above may be addressed by using a database to integrate privilege separation rules and network interception rules. The database is shared by a gateway master process operating at a privilege level sufficient to assign incoming access requests to uniquely identified slave processes operating at a relatively low privilege level. In this way, an attack request processed by an assigned slave on a compromised gateway is confined to executing under the limited slave process privileges, and not those of the master process.

As used herein, an "access gateway" comprises a network gateway that controls access by processes outside of a network to processes located within the network.

An "attack request" comprises instructions intended to circumvent access controls that protect computers from exploitation. A common example includes the buffer overflow attack, characterized by an explicit attempt to overload a predefined amount of space in a buffer, with the expectation of overwriting and corrupting data in memory. This type of attack can affect more than one system.

An "exploit code" comprises software, data, or commands that take advantage of a bug, glitch, or vulnerability in order to cause unintended or unanticipated behavior to occur with respect to software and/or hardware. Examples include gaining unauthorized control of a computer system, allowing privilege escalation, or executing a buffer overflow attack.

"File system privilege rules" comprise rules that operate to define and limit access to file system resources by active user processes.

A "key" uniquely identifies an association between at least two entities (e.g., rules and processes executing on a gateway).

A "master processing module" or "master process" comprises a process having root privileges running in a root directory, such as a chroot directory, operating (sometimes solely) to compile a list of policy rules for slave modules (to control behavior in an application, network, or system), to provide keys to associate the policy rules with the slave modules, and to distribute incoming access (e.g., proxy) requests to slave modules based on the type of request received. Examples of policy rules include: Incoming Port=Port1, Incoming Listener IP=IP1, Slave number (slave no), Slave System OS ID (Process Identification).

"Network interception policy rules" are rules that operate to prevent connection requests within a network that are not legitimate (e.g., a TCP connection request that has an unreachable return address made to a slave module). Two examples include: (a) Key—1111 (Slave OS Process ID), Connection, TCP, IP—All, Port—All, Deny; and (b) Key—1111 (Slave OS Process ID), Connection, TCP, IP—192.168.2.100-200, Port 443, Allow. Rule "a" means that a slave process with id 1111 cannot make any TCP connections to any address. Rule "b" provides exceptions to rule a, so that TCP connection are allowed, but only to those connections that are permitted by the configuration on the master for this slave. "Privilege separation rules" are rules that operate to define the read, write, and execute permissions that a master or a slave has with respect to the file system files and/or directories. Examples include: File permissions—Directories—{dr-xr-xr-x, User X (Slave User), 1111}, Files—{r--r--r--, User X (Slave User), 1111}, Directories—{drwxrwxrwx, User ROOT (Master User)}, Files—{rw-rw-r--, User X (Slave User), Executables—{rwx-rwx-r---, User X (Slave User)}. These rules are associated with every file or directory in the root directory (e.g., chroot) at install time. Each rule has a file name or a directory, followed by the users permissions of the file, the owner of the file, and the system identifier for the file. The designation "r" means any process that has privileges of a UserX can read that file or directory. The designation "w" means any process that has privileges of a UserX can write to that file or create files in that directory. The designation "x" means any process that has privileges of a UserX can execute that file.

A "slave module" or "slave process" comprises a process running as a user process and launched by a master processing module. The slave module has lower level privileges under the gateway OS than the master processing module.

A "slave module OS identifier" comprises an OS process identifier which is uniquely assigned by the master processing module to each slave module.

Various embodiments of the invention can be implemented in existing network architectures, directory services, security systems, storage interfaces, operating systems, file systems, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, or applications. Any particular architectural layout or implementation presented herein is thus provided for purposes of illustration and comprehension only, and is not intended to limit the various embodiments contemplated by this disclosure.

FIG. 1 is a flow diagram illustrating integrated privilege separation and network interception methods 111 according to various embodiments of the invention. The methods 111 are implemented in a machine-accessible and readable medium, and are operational over processes within and among networks, which may be wired, wireless, or a combination of wired and wireless. The methods 111 may be implemented as instructions, which when accessed by a machine, perform the processing depicted in FIG. 1. Given this context, integrated privilege separation and network interception is now discussed with reference to FIG. 1.

To provide both privilege separation and network interception within the same gateway, for example, an integrated privilege separation and network interception method 111 may begin at block 115 and continue on to block 123 with initializing a policy database accessible to a master processing module processing on a gateway. The policy database includes file system privilege rules and network interception policy rules associated by a key.

Network interception policy rules may be may be formulated using the iptables network interceptor available on the Linux® OS. An example of such an association includes: Key—1111, {(Slave OS Process ID), Connection, TCP, IP—All, Port—All, Deny}, {Connection, TCP, IP—192.168.2.100-200, Port 443, Allow}, Directories—{dr-xr-xr-x, User X (Slave User)}, Files—{r--r--r--, User X (Slave User)}. In this case, a slave process running with ID1111 can connect with TCP only to any address in the range 192.168.2.100-200, at port 443, and cannot have directory change permissions and file execute or write permissions.

The associating key, in turn, may comprise a slave module OS identifier which is unique, and uniquely assigned to slave modules by the OS as they are launched. The method 111 may continue at block 127 with launching one or more slave modules having access to the policy database, wherein each of the slave module(s) has its own unique slave module OS identifier. Only the master processing module knows the relationship between each of the slave modules and their respective policies within the database, which are related by the key.

For example, consider what can be done to contain "attack A," comprising an exploit code that attempts to take over the OS with the privileges that an AG has on the OS, attacking using the facilities of the OS (e.g., a bash shell access request); and "attack B," comprising an exploit code that uses the AG OS privileges to attack by making use of facilities that seem normal to the OS because it is common for an AG process to connect to various systems in the network to accomplish various functions (e.g., an AG process running payload code to scan the network coupled to an internal network server).

Privilege separation is a technique that is used to divide processes into lower privilege heavy weight processes (e.g., slave processes), handling most of the processing tasks, and higher privilege, light weight processes (e.g., master processes), that handle very few tasks. If incoming requests are assigned prudently to such divided processes, the risk of vulnerability exploits can be reduced.

Thus, in some embodiments, attack A can be contained when an AG is compromised if the gateway (e.g. a Linux® Access Gateway (LAG) runs at least two processes. In some embodiments, the LAG comprises a portion of a Novell® Access Manager, a reverse proxy providing services to access internal web servers.

One process can be executed with root privileges (e.g., a master process), running in a chroot directory with exclusive access to or maximum privileges within limited directories and libraries. The other process (e.g., a slave process, running as UserX) can execute with very few privileges (e.g., read, write, and execute privileges). Depending on the back end services that a user wants to access, the incoming request to the AG is forwarded and assigned to a selected slave process. The master process accords only minimal processing to the request. In this way, attack A can be contained as userX with very few "write" and "execute" permissions on the system.

However, this approach alone is not sufficient to contain an exploit which is also presented in the form of attack B. In this case, policy-based network interception is used, running under the control of the Master Process to prevent the slave process from connecting to any system other than the one the AG is configured to use. The network interception rules do not permit the slave process identified as UserX to connect to servers other than those allowed under the rules. Thus, UserX becomes the link between the file system privilege rules and network interception policy rules, and both types of attacks can be contained.

In many embodiments, the gateway has the ability to run multiple virtualized process instances, such as a master process and multiple slave processes. The master process has a higher privilege than the slave processes, and distributes incoming proxy requests to slave processes based on the request type. Slave processes, in turn, run as different users with relatively low privilege levels (lower than the master process).

The master process, upon initial execution, or when reconfigured, operates to populate the database with information concerning each user and its associated slave process, including network servers that the slave is permitted to access. For example, slave processes may be linked to permitted Internet Protocol (IP) addresses and ports. Users can be linked to permitted file system privileges under the OS. In addition, local network interception rules for the IP address and port combinations may also be specified. The slave processes are not permitted to write to the database, having only read access.

For Example, a request to IP address 10.1.1.1, port 443 (a master process listening port) may be distributed to slave process #1, while a request to IP address 10.1.1.2, port 443 (another master process listening port) can be distributed to slave process #2. Slave process #1 can execute with the privileges of User1, while slave process #2 can execute with the privileges of User2.

Processing the code forming the incoming proxy request is handled entirely by an assigned slave process. Thus, any vulnerability is prevented from providing write or execute write access to OS files, since the request is processed according to the reduced OS privileges of the assigned slave process, according to the entries in the database populated by the master process.

At the same time, attempts by exploit codes to make illegal network connections will also be prevented. For example, a request to a web-page from an external service corresponding to IP address 10.10.10.10 in an integrated database might be distributed by the master process so that a slave process running as User1 has access to only read a specified number of system files, with connection capability limited to IP address 10.10.10.10, port 80 using the transmission control protocol (TCP). This limits the connectivity of the slave process to only the configured IP address and ports.

Thus, when the database is used to integrate privilege separation and network interception, the rules for privilege separation and network interception policy can be chained together. Otherwise, if there are no additional firewalls in between the gateway and a Web Server, or if the firewall rules are not in synchronization (e.g., which can occur when the firewall is implemented as a separate device), then the chance of encountering a compromised gateway and network intrusion are increased. For example, if policy-based network interception is used without integrated privilege separation, then the network interception module itself may be vulnerable, because the attack code may bypass the network interception module. With integration, access to the OS file system and the AG slave processes are both more readily controlled.

Thus, many embodiments may be realized. For example, the method 111 may include receiving the request, such as a proxy request, at the master processing module at block 131. Once the request is received, the method 111 may go on to block 135, to include determining the request type associated with the request. Thus, the method 111 may include determining that the request is associated with a unique slave module OS identifier.

Based on the request type, the request can then be distributing to an assigned slave module at block 139. In most embodiments, once the policies are assigned by the master process within the database, then a particular slave process can process only a particular type of request.

Once the request has been distributed to an assigned slave process, operations put into effect by the request are limited by OS policy enforcement under the file system privilege rules and network interception policy rules according to the unique slave module OS identifier (forming a part of the key) at block 143. Thus, if the request comprises an attack request, the method 111 may include executing the request at block 151 using the assigned slave module in association with the unique slave module OS identifier without privileges to modify system files or exploit executable files of the OS on the gateway (e.g., by executing with no or low privileges). For example, an attack request may comprise slave module vulnerability exploit code.

In addition, if the request comprises an attack request, the method 111 may include executing the request at block 155 using the assigned slave module in association with the unique slave module OS identifier, wherein the slave module is prevented from connecting to or scanning any internet protocol address and port that is not specified in the network interception policy rules by intercepting illegal connection requests. For example, an attack request may comprise a request to activate an internal network scanner. The method 111 may then conclude at block 157.

Figure 2:
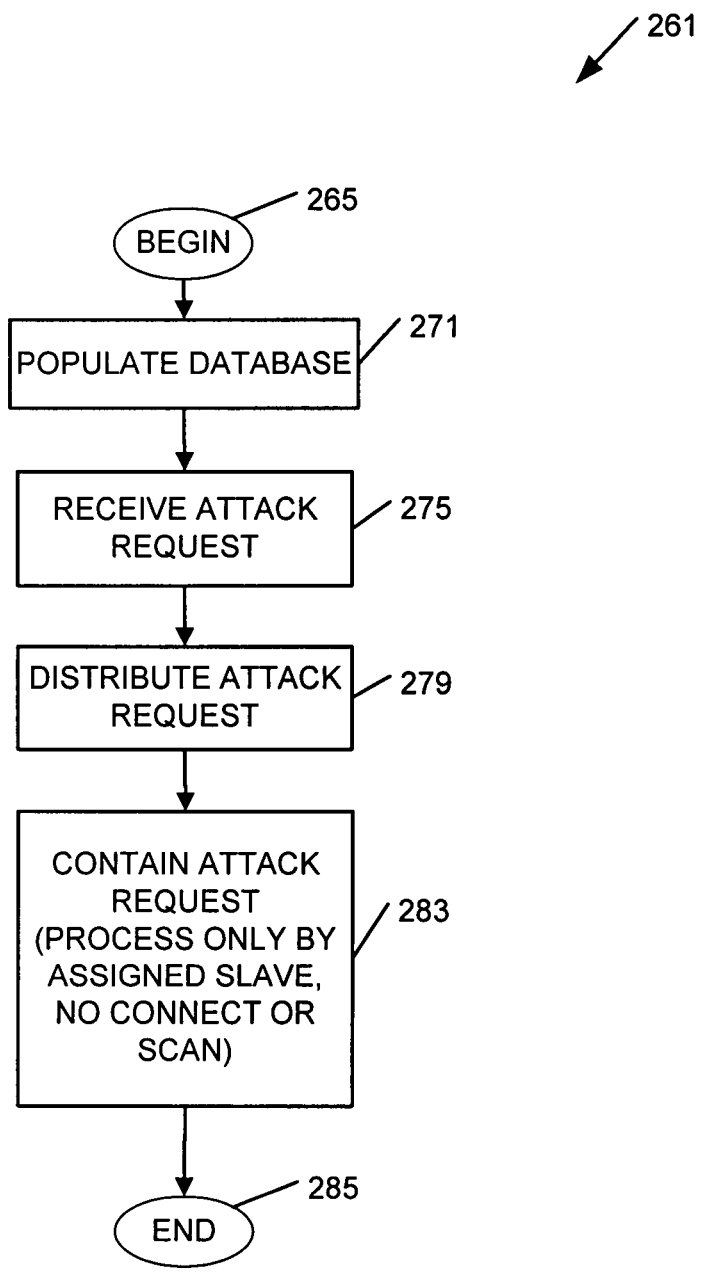
FIG. 2 is another flow diagram illustrating integrated privilege separation and network interception methods according various embodiments of the invention.

FIG. 2 is another flow diagram illustrating integrated privilege separation and network interception methods 261 according various embodiments of the invention. In this case, integrated privilege separation and network interception is described more specifically with respect to populating the shared database. The methods 261 are implemented in a machine-accessible and readable medium. The session replication methods 261 are operational over processes within and among networks. Such networks may be wired, wireless, or a combination of wired and wireless.

The methods 261 may be implemented as instructions, which when accessed by a machine, perform the processing depicted in FIG. 2. For example, the method 261 may begin at block 265, and continue on to block 271 with populating a shared policy database with network interception policy rules and file system privilege rules by a master processing module processing on a gateway.

The method 261 may include receiving an attack request, perhaps comprising OS privilege use instructions associated with a gateway, and slave process exploit code instructions, at block 275. In most embodiments, the method 261 includes distributing the attack request at block 279 to an assigned slave module based upon the slave module OS identifier, found in the database.

The method 261 may continue on to block 283 with containing the attack request, perhaps by processing the attack request as a user associated with an assigned slave module processing on the gateway, wherein the slave module is prevented from connecting to or scanning any internet protocol address and port that is not specified in a policy database. In this way, it is possible to permit processing instructions included in the attack request to occur solely within the assigned slave module. The method 261 may then conclude at block 285.

The database can include a variety of network interception policy rules and a variety of file system privilege rules associated by a key comprising the slave module OS identifier associated with the assigned slave module. For example, the file system privilege rules can operate to limit file access to read-only access. The network interception policy rules may operate to limit connection to a selected IP address and a selected IP port. Both types of protection are accessible from the same database, shared between the master process and the slave processes.

Figure 3:
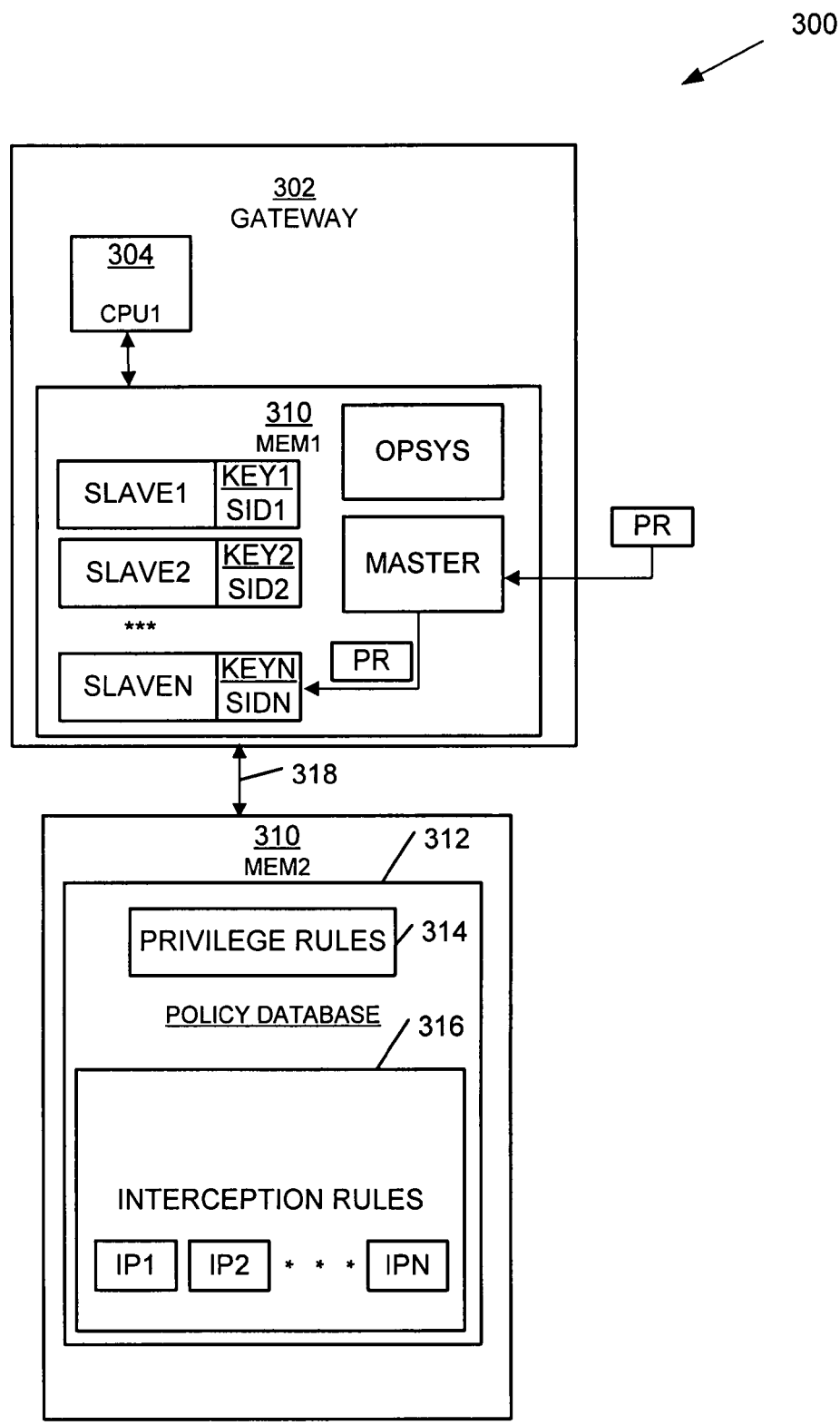
FIG. 3 is a block diagram of an integrated privilege separation and network interception apparatus according various embodiments of the invention.

FIG. 3 is a block diagram of an integrated privilege separation and network interception apparatus 300 according various embodiments of the invention. The integrated privilege separation and network interception apparatus 300 is implemented in a machine-accessible and readable medium and is operational over one or more networks (e.g., the local area network (LAN) 318). The network 318 may be wired, wireless, or a combination of wired and wireless. The integrated privilege separation and network interception apparatus 300 implements, among other things, the processing associated with the integrated privilege separation and network interception methods 111 and 261 of FIGS. 1 and 2, respectively.

Turning now to FIG. 3, it can be seen that in some embodiments the integrated privilege separation and network interception apparatus 300 comprises a master processing module MASTER implemented in a machine accessible medium (e.g., memory 310 (MEM1)) to process on a gateway 302. The gateway 302 may comprise an application gateway running as a system user, or an access gateway operating under a Linux® operating system and/or a Microsoft® Windows® operating system.

The apparatus 300 also includes a memory 310 (MEM2) to store a policy database 312 to be shared by the master processing module MASTER and a plurality of slave modules SLAVE1, SLAVE2, . . . , SLAVEN. The policy database 312 includes file system privilege rules 314 and network interception policy rules 316 associated by a key KEY1, KEY2, . . . , KEYN comprising a slave module operating system identifier (e.g., corresponding identifiers SID1, SID2, . . . , SIDN, perhaps comprising the OS process identification). The master processing module MASTER can operate to populate the policy database 312 with the file system privilege rules 314 and network interception policy rules 316.

As noted above, a unique slave module operating system identifier SID1, SID2, . . . , SIDN is assigned to each slave process SLAVE1, SLAVE2, . . . , SLAVEN by the OS. Thus, multiple slave modules SLAVE1, SLAVE2, . . . , SLAVEN may be implemented in a machine accessible medium (e.g., MEM1) to process on the gateway 302, wherein each one of the multiple slave modules SLAVE1, SLAVE2, . . . , SLAVEN is characterized by a unique one of the slave module operating system identifiers SID1, SID2, . . . , SIDN. Each one of a plurality of slave processes SLAVE1, SLAVE2, . . . , SLAVEN launched on the gateway 302 may thus be associated with a unique one of the slave module operating system identifiers SID1, SID2, . . . , SIDN assigned by the operating system OPSYS (via the master processing module MASTER) executing on the gateway 302.

In most embodiments, the gateway 302 operates to receive access requests, such as proxy requests PR at the master processing module MASTER for distribution to an assigned slave module (e.g., SLAVEN) selected from one of the plurality of slave modules SLAVE1, SLAVE2, . . . , SLAVEN. Slave modules may be assigned based on many factors, such as their current workload, or the set of web servers for which they serve as an entrance point.

In some embodiments, the apparatus 300 includes an operating system OPSYS to process on the gateway 302, and to enforce the file system privilege rules 314 associated with the assigned slave module SLAVEN and a unique one of the slave module OS identifiers SIDN. The apparatus 302 also includes an operating system OPSYS to enforce the network interception policy rules 316 associated with the assigned slave module SLAVEN and a unique one of the slave module OS identifiers SIDN. In this way, an assigned slave module SLAVEN originating a connection is permitted to connect to systems with an IP address only when IP addresses IP1, IP2, . . . , IPN specified in the network interception policy rules 316 associated with the assigned slave module (e.g., IPN associated with SLAVEN) are used.

For example, if the request PR is an attack request, perhaps comprising OS privilege use instructions associated with the gateway 302 and slave process exploit code instructions, the request PR can be contained as a user associated with the assigned slave module SLAVEN and prevented from connecting to or scanning any internet protocol address and port that is not specified in the network interception policy rules (e.g., IPN as part of IP1, IP2, . . . , IPN).

The apparatus 300 may comprise an execution element or processor 304, such as a switch (e.g., an L4 switch), a server, a terminal, a personal computer, a workstation, or any combination of these, coupled together within a LAN 318. Modules may comprise hardware, software, and firmware, or any combination of these.

The execution element 304 may comprise a single entity, or several entities in communication with one another, such as one or more Novell® BorderManager® (NBM) proxy servers, Novell® Access Manager™ Linux® Access Gateways, or any intermediary.

Figure 4:
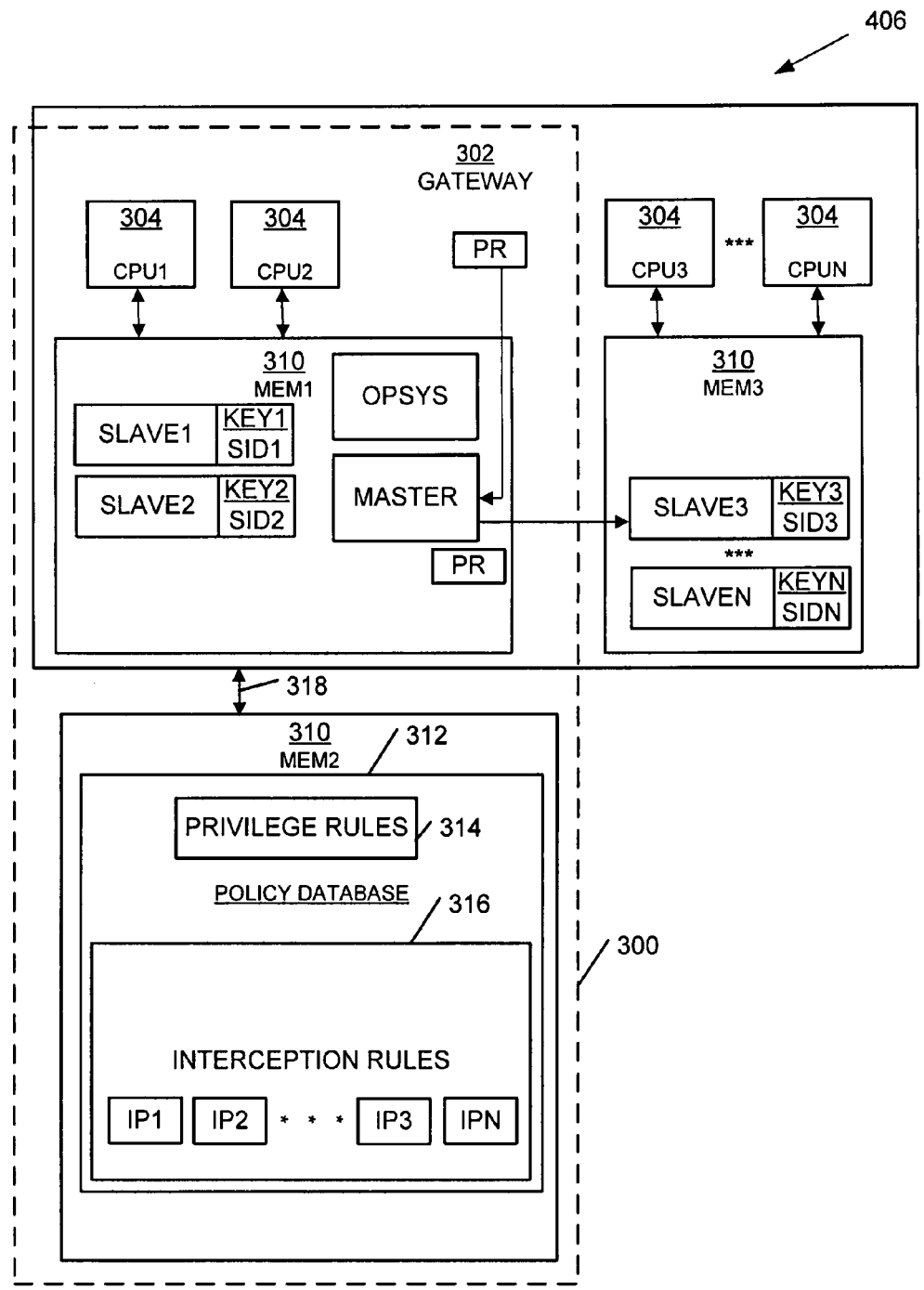
FIG. 4 is a block diagram of an integrated privilege separation and network interception system according various embodiments of the invention.

FIG. 4 is a block diagram of an integrated privilege separation and network interception system 406 according various embodiments of the invention. The integrated privilege separation and network interception system 406 is implemented in a machine-accessible and readable medium and is operational over one or more networks (e.g., LAN 318). The network 318 may be wired, wireless, or a combination of wired and wireless. The integrated privilege separation and network interception system 406 may includes multiple instances of the apparatus 300 (similar to or identical to the apparatus 300 shown in FIG. 3), and implements, among other things, the processing associated with the integrated privilege separation and network interception methods 111 and 261 of FIGS. 1 and 2, respectively.

Turning now to FIG. 4, it can be seen that an integrated privilege separation and network interception system 406 may comprise a master processing module MASTER implemented in a machine accessible medium MEM1 to process on a gateway 302, as well as a memory MEM2 to store a policy database 312 to be shared by the master processing module MASTER. The policy database 312 may include file system privilege rules 314 and network interception policy rules 316 associated by keys KEY1, KEY2, . . . , KEYN comprising corresponding slave module operating system identifiers SID1, SID2, . . . , SIDN, as noted previously.

The system 406 may also include a plurality of slave modules SLAVE1, SLAVE2, SLAVE3, . . . , SLAVEN implemented in one or more machine accessible media 310 (e.g., MEM1 and MEM3) to process on a corresponding plurality of processors 304 (e.g., CPU1, CPU2, CPU3, . . . , CPUN).

Thus, when an attack request PR comprising OS privilege use instructions associated with the gateway 302 and slave process exploit code instructions, is presented, the attack request PR can be contained as a user associated with an assigned one of the plurality of slave modules (e.g., SLAVE3) and prevented from connecting to or scanning any internet protocol address and port that is not specified in the network interception policy rules 316 (addresses and ports not included in IP1, IP2, IP3, . . . , IPN). The gateway 302 may comprise an access gateway operating under one or more of a Linux® OS and a Microsoft® Windows® operating OS, if desired. All memories 310 (see FIGS. 3 and 4) may comprise volatile or non-volatile memories, or a combination of the two.

Implementing the apparatus, systems, and methods described herein may thus provide improved network security by providing a combination of file system privilege rules and network interception policy rules associated by keys comprising slave module OS identifiers. This implementation can improve the ability of a gateway to contain user code exploits in the face of a reduced number of firewalls located between the gateway and internal network servers, or when the gateway configuration is not synchronized with firewall rules.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
a master processing module implemented in a machine accessible medium to process on a gateway; and
a memory to store a policy database to be shared by the master processing module and a plurality of slave modules, the policy database including file system privilege rules and network interception policy rules associated by keys, each of the network interception policy rules providing policies that control connection requests to a requested system resource, each of the file system privilege rules limiting access to a connected system resource, and each slave module of the plurality of slave modules being assigned a key of the keys as its slave module operating system identifier such that the key simultaneously and uniquely identifies at least one file system privilege rule and at least one network interception policy rule to be used by the slave module to service requests distributed thereto, the master processing module configured to select an assigned slave module from the plurality of slave modules to service a request based on a request type of the request and a first key of the keys assigned to the assigned slave module as its slave module operating system identifier, the first key simultaneously and uniquely identifying the at least one network interception policy rule and the at least one file system privilege rule to be used by the assigned slave module, the assigned slave module configured to prevent the request from connecting to system resources targeted by the request using the at least one network interception policy rule identified by the first key, or to prevent the request from modifying at least a portion of the system resources connected by the request using the at least one file system privilege rule identified by the first key.

2. The apparatus of claim 1, wherein the gateway comprises:
an application gateway.

3. The apparatus of claim 1, wherein the plurality of slave modules are implemented in the machine accessible medium to process on the gateway, and wherein each one of the plurality of slave modules is characterized by a unique one of the slave module operating system identifiers.

4. The apparatus of claim 1, wherein the gateway is to receive proxy requests at the master processing module for distribution to the assigned slave module.

5. The apparatus of claim 4, comprising:
an operating system to process on the gateway and to enforce the file system privilege rules associated with the assigned slave module and a unique one of the slave module operating system identifiers.

6. The apparatus of claim 4, comprising:
an operating system to process on the gateway and to enforce the network interception policy rules associated with the assigned slave module and a unique one of the slave module operating system identifiers.

7. The apparatus of claim 6, wherein the assigned slave module originating a connection is permitted to connect to systems with an Internet Protocol (IP) address only when IP addresses specified in the network interception policy rules associated with the assigned slave module are used.

8. The apparatus of claim 1, wherein the master processing module is to populate the policy database with the file system privilege rules and network interception policy rules.

9. The apparatus of claim 1, wherein the master processing module is to assign a unique one of the slave module operating system identifiers to each one of the plurality of slave processes implemented on the gateway.

10. The apparatus of claim 1, wherein each one of a plurality of slave processes launched on the gateway is associated with a unique one of the slave module operating system identifiers assigned by an operating system executing on the gateway.

11. A system, comprising:
a master processing module implemented in a machine accessible medium to process on a gateway;
a memory to store a policy database to be accessed by the master processing module, the policy database including file system privilege rules and network interception policy rules associated by keys, each of the network interception policy rules providing policies that control connection requests to a requested system resource and each of the file system privilege rules limiting access to a connected system resource; and
a plurality of slave modules implemented in a machine accessible medium to process on a corresponding plurality of processors and to share access to the policy database, each slave module of the plurality of slave modules being assigned a key of the keys as its slave module operating system identifier such that the key simultaneously and uniquely identifies at least one file system privilege rule and at least one network interception policy rule to be used by the slave module to service requests distributed thereto, the master processing module configured to select an assigned slave module from the plurality of slave modules to service a request based on a request type of the request and a first key of the keys assigned to the assigned slave module as its slave module operating system identifier, the first key simultaneously and uniquely identifying the at least one network interception policy rule and the at least one file system privilege rule to be used by the assigned slave module, the assigned slave module configured to prevent the request from connecting to system resources targeted by the request using the at least one network interception policy rule identified by the first key, or to prevent the request from modifying at least a portion of the system resources connected by the request using the at least one file system privilege rule identified by the first key.

12. The system of claim 11, wherein an attack request, comprising operating system privilege use instructions associated with the gateway and slave process exploit code instructions, is contained as a user associated with an assigned one of the plurality of slave modules and prevented from connecting to or scanning any internet protocol address and port that is not specified in the network interception policy rules.

13. The system of claim 11, wherein the gateway comprises:
an access gateway operating under one of a Linux® operating system and a Microsoft® Windows® operating system.

14. A method, comprising:
initializing a policy database accessible to a master processing module processing on a gateway, wherein the policy database includes file system privilege rules and network interception policy rules associated by keys, each of the network interception policy rules providing policies that control connection requests to a requested system resource and each of the file system privilege rules limiting access to a connected system resource, the initializing including assigning each slave module of a plurality of slave modules a key of the keys as its slave module operating system identifier such that the key simultaneously and uniquely identifies at least one file system privilege rule and at least one network interception policy rule to be used by the slave module to service requests distributed thereto; and
selecting an assigned slave module from the plurality of slave modules to service a request based on a request type of the request and a first key of the keys assigned to the assigned slave module as its slave module operating system identifier, the first key simultaneously and uniquely identifying the at least one network interception policy rule and the at least one file system privilege rule to be used by the assigned slave module, the assigned slave module configured to prevent the request from connecting to system resources targeted by the request using the at least one network interception policy rule identified by the first key, or to prevent the request from modifying at least a portion of the system resources connected by the request using the at least one file system privilege rule identified by the first key.

15. The method of claim 14, comprising:
receiving the request at the master processing module;
determining the request type of the request; and
distributing the request to the assigned slave module based on the request type.

16. The method of claim 15, wherein the distributing comprises:
determining that the request is associated with the slave module operating system identifier corresponding to the first key, the determining based on comparing characteristics of a task associated with the request with the at least one file system privilege rule or the at least one network interception policy rule identified by the first key.

17. The method of claim 15, wherein operations put into effect by the request are limited by operating system policy enforcement under the at least one file system privilege rule and the at least one network interception policy rule identified by the first key.

18. The method of claim 15, further comprising:
if the request comprises an attack request, executing the request using the assigned slave module in association with the slave module operating system identifier corresponding to the first key, without privileges to modify system files or exploit executable files of an operating system on the gateway.

19. The method of claim 18, wherein the attack request comprises slave module vulnerability exploit code.

20. The method of claim 15, further comprising:
if the request comprises an attack request, executing the request using the assigned slave module in association with the slave module operating system identifier corresponding to the first key, wherein the assigned slave module is prevented from connecting to or scanning any internet protocol address and port that is not specified in the at least one network interception policy rules identified by the first key.

21. The method of claim 20, wherein the attack request comprises a request to activate an internal network scanner.

22. A method, comprising:
receiving, at a gateway, an attack request comprising operating system privilege use instructions associated with gateway and slave process exploit code instructions, the gateway comprising a plurality of slave modules processing thereon, and a policy database having network interception policy rules and file system privilege rules associated by keys, each on the network interception policy rules providing policies that control connection requests to a requested system resource, each of the file system privilege rules limiting access to a connected system resource, and each slave module of the plurality of slave modules being assigned a key of the keys as its slave module operating system identifier such that the key simultaneously and uniquely identifies at least one file system privilege rule and at least one network interception policy rule to be used by the slave module to service requests distributed thereto; and
selecting an assigned slave module from the plurality of slave modules to contain the attack request by processing the attack request using the assigned slave module, the selecting based on a request type of the attack request and a first key of the keys assigned to the assigned slave module, the first key simultaneously and uniquely identifying the at least one network interception policy rule and the at least one file system privilege rule to be used by the assigned slave module, and the assigned slave module configured to prevent the attack request from connecting to system resources targeted by the attack request using the at least one network interception policy rule identified by the first key, or to prevent the attack request from modifying at least a portion of the system resources connected by the attack request using the at least one file system privilege rule identified by the first key.

23. The method of claim 22, comprising:
distributing the attack request to the assigned slave module based upon the slave module operating system identifier.

24. The method of claim 22, further comprising:
populating the policy database with the network interception policy rules and the file system privilege rules by a master processing module processing on the gateway.

25. The method of claim 22, wherein the file system privilege rules limit file access to read-only access.

26. The method of claim 22, wherein the network interception policy rules limit connection to a selected Internet Protocol (IP) address and a selected IP port.

27. The method of claim 22, further comprising:
processing instructions included in the attack request solely by the assigned slave module.

28. The method of claim 22, wherein the limiting access to the connected system resource comprises:
assigning a corresponding slave module at least one of a read permission, a write permission or an execute permission for the connected system resource.

29. The method of claim 22, wherein each of the keys assigned to a corresponding slave module comprises information different from an address of the corresponding slave module.

30. The method of claim 22, wherein each slave module of the plurality of slave modules is configured to service only one type of request indicated by the at least one file system privilege rule and the at least one network interception policy rule identified by a corresponding key of the keys assigned to the slave module.

* * * * *